(12) United States Patent
Yee et al.

(10) Patent No.: US 11,687,990 B2
(45) Date of Patent: Jun. 27, 2023

(54) SYSTEM AND APPARATUS FOR A PERSONALIZED REMOTE SHOPPING ASSISTANCE

(71) Applicant: Robert Bosch GmbH, Stuttgart (DE)

(72) Inventors: Seow Yuen Yee, Mountain View, CA (US); Oliver Peters, Bad Liebenzell (DE); Christian Peters, Mountain View, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 200 days.

(21) Appl. No.: 16/710,356

(22) Filed: Dec. 11, 2019

(65) Prior Publication Data
US 2021/0182930 A1 Jun. 17, 2021

(51) Int. Cl.
G06Q 30/00 (2023.01)
G06Q 30/0601 (2023.01)
G06F 1/16 (2006.01)

(52) U.S. Cl.
CPC ......... *G06Q 30/0613* (2013.01); *G06F 1/163* (2013.01)

(58) Field of Classification Search
CPC ............................ G06Q 30/0613; G06F 1/163
See application file for complete search history.

(56) References Cited

U.S. PATENT DOCUMENTS

| | | | |
|---|---|---|---|
| 8,606,642 B2 | 12/2013 | Siounis et al. | |
| 10,885,336 B1* | 1/2021 | Davis | G06N 7/005 |
| 2008/0148308 A1* | 6/2008 | Hughes | G06Q 30/0601 725/10 |
| 2012/0265651 A1 | 10/2012 | Ephraim | |
| 2016/0350704 A1* | 12/2016 | Minvielle | G06Q 10/087 |
| 2018/0193699 A1* | 7/2018 | DeBates | A61B 5/224 |
| 2020/0152312 A1* | 5/2020 | Connor | G01N 33/02 |
| 2020/0309757 A1* | 10/2020 | Ramos | G01N 31/22 |
| 2021/0314527 A1* | 10/2021 | Kaus | H04N 7/18 |

FOREIGN PATENT DOCUMENTS

KR 1020120098261 A 9/2012

OTHER PUBLICATIONS

McMillin, Kenneth W. "Advancements in meat packaging." Meat science 132 (2017): 153-162.*

* cited by examiner

*Primary Examiner* — Kathleen Palavecino
(74) *Attorney, Agent, or Firm* — Dickinson Wright PLLC (57) ABSTRACT

A wearable device worn on a remote shopping assistant that includes one or more sensors configured to detect a weight, quantity, freshness and quality of one or more grocery items, a transceiver configured to communicate data indicative of the weight, quantity, freshness and quality of the one or more grocery items to and from a remote server, wherein the remote server is configured to communicate data to a remote shopper, and a camera configured to capture image data related to the one or more grocery items.

12 Claims, 5 Drawing Sheets

SYSTEM AND APPARATUS FOR A PERSONALIZED REMOTE SHOPPING ASSISTANCE

TECHNICAL FIELD

The present disclosure relates to remote shopping systems.

BACKGROUND

Grocery shopping can be both tiring and time consuming, especially when there may be traffic jams on the way to the store, multiple store visits, and store locations being inconvenient, and long lines to check out. Online purchase and delivery of groceries is an alternative, however, many shoppers may prefer to shop on their own at grocery stores. This may be due to shoppers wanting to be in control of quality and to avoid the experience of ending up with bad groceries (e.g., spoiled or rotten produce) even after paying the premium price of delivery. In addition, some shoppers prefer to walk around through the aisles, as they are inspired to cook based on the freshness and availability of the produce. For example, certain produce may be in season, while others are out of season. Or in another example, certain produce may be grown locally versus internationally. On the other hand, shoppers like to select the right amount of quantity needed for cooking but often time, online purchase limit the minimum purchase amount.

SUMMARY

According to one embodiment, a system for remote shopping that includes a wearable device worn on a remote shopping assistant, wherein the wearable device includes one or more sensors configured to detect at least a weight of one or more grocery items, and a wearable device transceiver configured to communicate data indicative of the weight of the one or more grocery items to and from a remote server, wherein the remote server is configured to communicate data to a remote shopper. The wearable device also includes a camera configured to capture image data related to the one or more grocery items and a processor in communication with the wearable device transceiver, the camera, and the one or more sensors, wherein the processor is configured to determine a freshness level associated with the one or more grocery items utilizing at least the one or more sensors.

According to a second embodiment, a server utilized in remote shopping that includes a transceiver configured to wirelessly communicate with a mobile device associated with a remote shopper and a wearable device associated with a shopping assistant and configured to capture images and freshness information associated with one or more grocery items retrieved from the remote shopper. The server also includes a processor in communicate with the transceiver and programmed to receive data indicative of an item list associated with the remote shopper, wherein the item list includes one or more grocery items, send one or more images to the mobile device associated with the remote shopper, wherein the one or more images include images related to the one or more grocery items, receive a request from the remote shopper, wherein the request includes information related to purchasing the one or more grocery items, and in response to the request, send instructions to the wearable device associated with the shopping assistant, wherein the instructions include information related to purchasing the one or more grocery items.

According a third embodiment, a wearable device worn on a remote shopping assistant includes one or more sensors configured to detect a weight and color of one or more grocery items, a transceiver configured to communicate data indicative of the one or more grocery items to and from a remote server and a remote shopper via the remote server, a camera configured to capture image data related to the one or more grocery items, a display configured to output information, and a processor in communication with the transceiver, the camera, the display, and the one or more sensors, wherein the processor is configured to determine a freshness level associated with the one or more grocery items utilizing at least the one or more sensors.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As an alternative to shopping in the stores, an alternative may include an autonomous car driving groceries to the shopper at their home or around a neighborhood for purchase. However, such an alternative may be energy inefficient as it requires keeping the grocery fresh and driving the autonomous car. Therefore, a remote shopping assistance system may allow shoppers to have the experience of shopping in real-time without needing to drive to the store or waiting in line to pay, and yet have control on grocery selection as well as personalizing it based on needs.

The remote shopping assistance system may allow consumers to access real-time camera information in view of the groceries on the shelves in supermarket. The camera may capture images that update frequently. In another embodiment, a shopping assistant may utilize a body camera or smart glasses. A smart glove may be used by a remote shopping assistant which can capture and record the type, weight, quantity, size, color, water content, defects, and freshness of the produce or grocery items. Any defects will also be recorded. The remote shopper can thus decide the quantity of groceries they want, with even a small amount for herbs. A discount can be offered to consumers in some instances, such as 10% off if some defects are found, 50% off the item needs to be consumed on the same day, etc. Remote shoppers can also select if the groceries have to be perfect or can tolerate a 10% or more latitude in defects. Advertisement from shops can also be displayed on the same app.

Cameras or mobile device with cameras can be utilized by the remote shopping assistant, which may be mounted on produce shelves. The cameras can capture these images and displayed real time through a mobile app or online portal to the shoppers. Shoppers can therefore be inspired by looking at the real-time video images, or have the ability to zoom in and pan the view of the camera to look at the produce. This allows shoppers to see the produce anytime they want and have the ability to gauge if they want to buy the produce today or to pass on the purchase. This option can be either adapted to the current shelves in traditional grocery stores or adapted to a produce facilities, where there are only shelves of produce and a camera which can move around the shelves or a rotating shelves with a stationary camera, and a produce picking mechanism which can select the produce based on shopper's need.

The video processing system may be an intelligent system that is configured to automatically detect people and blur faces of other customers to protect privacy of other customers. Thus, the system may be configured to only show image detail of the product of interest to the remote shopper. Each shopper may have a personalized assistant that is assigned to shop for them. The assistant will have a body mounted real-time streaming camera, with options to self-blur the image if the camera is capturing images of human to protect privacy, and thus only grocery items (e.g., produce) may be displayed. By using these smart camera and gloves, the shoppers can direct the assistant in real-time on which produce they want, the quantity needed, and make the decision in real-time. The advantage of this method is that shoppers can be more agile and make decisions in real-time such as if the shopper have a change of mind and want to buy something else instead. For example, if today's broccoli looks old while the cauliflower looks fresh, a shopper can change to buy cauliflower instead. The smart gloves can also provide real-time gauge on the freshness and quality of the produce. The glove can utilize sensors to determine if the produce is very ripe, soft, or it is hard which in turn requires more time to ripen. Shoppers can then decide if they would like ripe produce (e.g., because they want to cook the produce right away) or if they would like a less ripe produce because they will only cook it a couple days later. Stores can also offer discounts for produce which requires to be eaten right away to encourage shoppers to buy food that might expire and reduce food wastage. Thus, sensors may communicate to the store that certain produce is not as fresh or is spoiling. This creates a positive situation for both the retailer and shopper, as the shopper can get cheaper produce and stores can sell the food on time. In addition, the personalized assistant can pick out any amount desired by the shopper without having any minimum limits. The system may require the shopper to have 10-15 mins to be online to tell the shopping, assistant what they want to buy which can be frustrating if the assistant does not purchase the items wanted or if they are in a hurry and do not have time to direct the shopping assistant. In that case, the shopper can set up certain preferences to help speed up the process.

Figure 1:
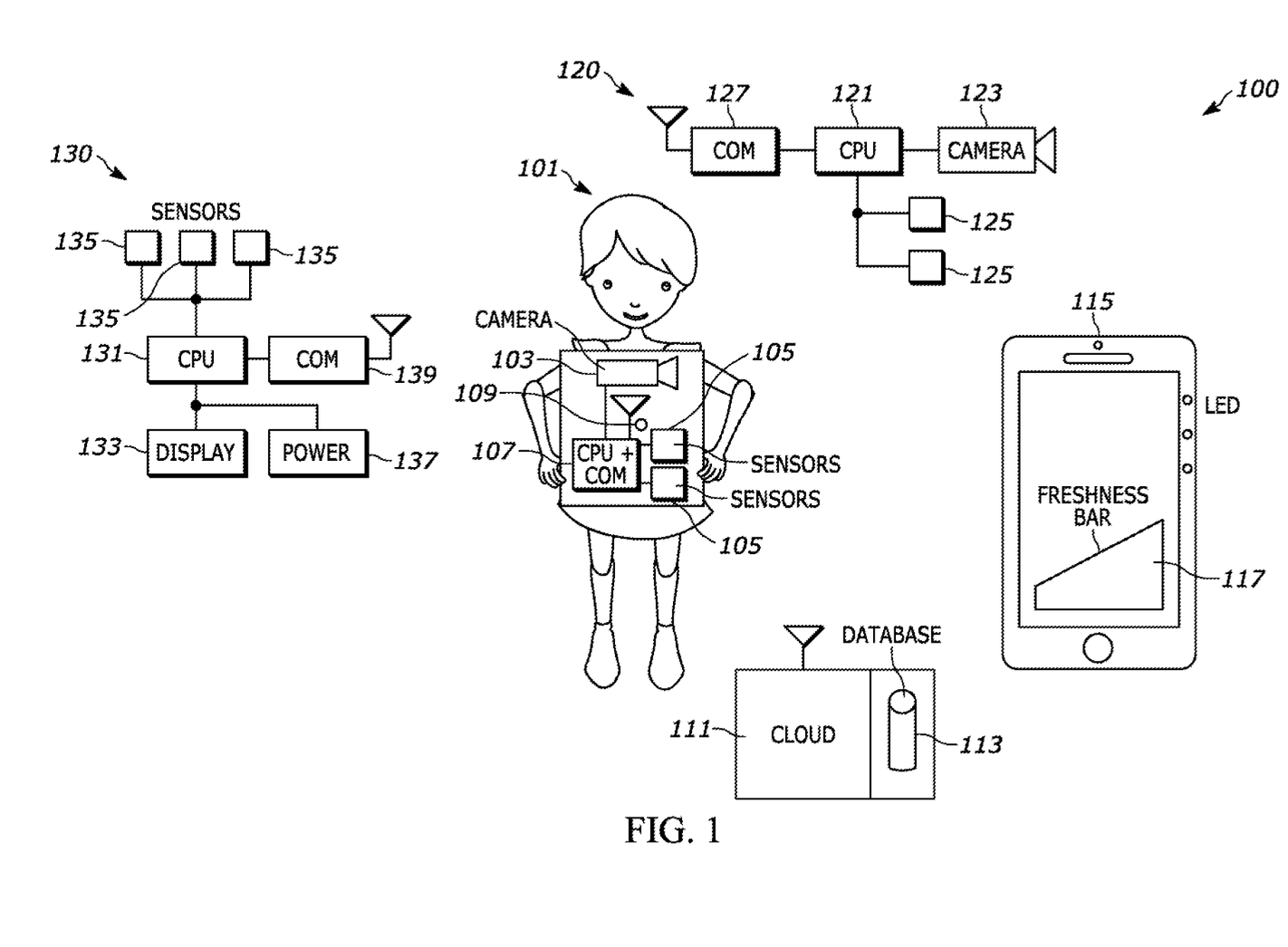
FIG. 1 is an overview of a system with a personalized remote shopping assistance.

FIG. 1 is an overview of a system with a personalized remote shopping assistance. The shopping system 100 may include a shopping assistant 101 (e.g., remote shopping assistant). The system may be equipped with various equipment to help with remote shopping assistance. The remote shopping assistant 101 may be a shopper from a shopping service, such as Shipt, Instacart, Peapod, etc. In another embodiment, the remote shopping assistant 101 may be a robot or another programmable machine. The remote shopping assistant 101 may include a camera 103. The camera may be any type of camera, such as a time-of-flight camera, action camera, point-and-shoot camera, light-field camera, digital SLR, etc. The camera 103 may be utilized to identify a location of a store that the remote shopping assistant 101 is located in, or to identify products in an aisle. The camera 103 may be utilized to identify various groceries or produce. For example, the camera may be utilized to distinguish and identify one fruit from another fruit, vegetable, or other item.

The camera 103 may also be in communication with a CPU 107 that includes one or more processors. The processors may be operatively connected to a memory unit. The processors may include one or more integrated circuits that implement the functionality of a central processing unit (CPU) 107. The processor may be a commercially available processing unit that implements an instruction stet such as one of the x86, ARM, Power, or MIPS instruction set families. During operation, the CPU 107 may execute stored program instructions that are retrieved from the memory unit. The stored program instructions may include software that controls operation of the CPU 107 to perform the operation described herein. In some examples, the processor may be a system on a chip (SoC) that integrates functionality of the CPU 107, the memory unit, a network interface, and input/output interfaces into a single integrated device. The shopper's system may implement an operating system for managing various aspects of the operation.

The memory unit may include volatile memory and non-volatile memory for storing instructions and data. The non-volatile memory may include solid-state memories, such as NAND flash memory, magnetic and optical storage media, or any other suitable data storage device that retains data when the shopping system is deactivated or loses electrical power. The volatile memory may include static and dynamic random-access memory (RAM) that stores program instructions and data. For example, the memory unit may store a machine-learning model or algorithm, a training dataset 112 the machine-learning model, raw source dataset, etc.

The computing system may include a network interface device that is configured to provide communication with external systems and devices. For example, the network interface device (e.g., transceiver) may include a wired and/or wireless Ethernet interface as defined by Institute of Electrical and Electronics Engineers (IEEE) 802.11 family of standards. The network interface device may include a cellular communication interface for communicating with a cellular network (e.g., 3G, 4G, 5G). The network interface device may be further configured to provide a communication interface to an external network or cloud. Thus, the network interface device may communicate data to various subsystems of the shopping system 100.

The remote shopping assistant 101 may be equipped with various sensors 105 that are in communication with the CPU

107. The sensors 105 may be various sensors that are utilized to help identify freshness of the produce. For example, the sensors 105 may be configured to identify color levels, moisture, mold, temperature, etc. For example, the sensors 105 may be gas sensors, chemical sensors, spectrometer, optical sensor, etc. The sensor data indicating various attributes of the produce's quality may be communicated to the various subsystems via the CPU 107 with a transceiver. The CPU 107 may, for example, utilize image recognition based on photographic data supplied by a camera to identify a type of fruit. In another embodiment, the CPU 107 may utilize image recognition to scan a bar code and determine the item and associate details (e.g., pricing, manufacturer, etc.) with that item.

The shopping assistant may also include additional sensors to provide further information about the product freshness like gas sensors, chemical sensors, optical sensors or spectrometer. These sensors in combination with another wearable device (e.g., glove) and the camera may help the user to pick the right product or produce. The value of these sensors can be displayed in the app to the customer's mobile device with values or color bars to associate a freshness level. For example, green may be equated with fresh, yellow may indicate the item needs to be consumed soon, and red may indicate that the item is rotten or should not be purchased. The display can also be integrated into the glove or wearable device to display the freshness level. If the remote assistant picks a product, the display on the wearable device (e.g., glove) shows the condition of the product (e.g., freshness, firmness, weight, etc.).

In another embodiment this information may be projected into the video stream using virtual reality (VR) or augmented reality (AR) techniques. Products that are selected and tested may get virtually marked and rated using VR/AR techniques. This may allow for the remote assistance and the customer to avoid picking the same product twice or if there is no better product to easily identify the best product. The system may automatically identify the product and adjusts the values and/or color bar (e.g., freshness level) accordingly. The system may include a learning option and uses the input from the customer after the products arrive to improve the predication to the customer needs and preferences. Over time less and less interaction of the customer with the assistant will be needed.

The remote assistant may also wear different real-time localization systems like GPS or special indoor localization solutions like BLE beacon or ultra-wideband radio technology. In one embodiment, the system can pre-optimize the route for the shopping assistant inside the grocery store or facility based on the items on the shopping list. This can be done such that the shopping assistant can most efficiently shop for the shopper. Based on the location and the shopping list, the system can inform the remote shopper of whether their direct input is needed. If the remote shopper is not immediately available, the assistant may be guided first to products where no input is needed (e.g., soap as opposed to produce). In the alternative, the assistant can assist other customers first. In another alternative, the system can also learn the preferred time where the shopper is normally available and be able to schedule the time accordingly. In yet another alternative, shopper can also pre-set certain preferences in their profile where the shopping assistant will have some guidance in selecting the best product for the shopper when the shopper is not available. In another alternative, the shopper can also select which item on the list needs confirmation from the shopper. The shopping assistant can first pick up all the items which does not need confirmation while waiting for the shopper to be available online. All in all, the system may allow the shopper to customize the best shopping experience based on his/her needs.

In one embodiment, an optical spectrometer can be used to determine the color of the produce. The produce color can correlate to the ripeness and freshness of the produce. In addition, an optical spectrometer can also measure the water content of the produce as produce with more water or sugar content adsorbs the light/wavelength differently than produce with less water or sugar content. An optical spectrometer can also be used to identify types of produce due to their composition. For example, an apple will adsorb the light differently than an orange. The measurement of the light absorption or other light information can be compared with a library of data which is continuously updated based on data recorded. Another type of spectroscopy may be an acoustic/ultrasonic spectroscopy. Similarly, instead of using light, it may also use sound waves. Due to different adsorption of the sound, the sensor or system can differentiate the produce based on their ripeness, freshness, color, water content, sugar content, etc.

A gas sensor may be utilized to identify how an item or produce releases different odor when they are ripening or decay. For example, as fruit (e.g. banana) ripens, the fruit may release ethylene (a hydrocarbon gas). An ethylene gas sensor, or similar gas sensor, can be used to "smell" the fruit and determine their ripeness as well as types of fruits. Thus, the gas sensor may measure certain types of gases to determine ripeness. On the other hand, for example of decay, due to bacteria breaking down the produce, hydrogen sulfide may be released during, bacteria activity. Additionally, different produce releases different VOC (volatile organic compounds) gasses into the air. Such gasses may be measured to determine a freshness level. Most odors or scents released may be types of VOC. The system may also utilize the gas sensor to help identify the type of produce. For example, the gas sensor may be able to differentiate between an orange and a melon due to the different gasses they release.

For an experienced shopper, smelling the fruit may be determined if the fruit is ripe. The "smell" or odor can be detected with gas or chemical sensors and can be used in a scale of ripeness or quality of the fruit, which can be related to remote shoppers for their pick. Customers can determine if they want a ready to eat fruit soon (e.g., ripe today based on the smell), or select a fruit which will be eaten in the next few days.

In one example, chemical sensors may be used to determine the different chemical composition of different types of produce. The chemical sensor may be optical, electrochemical, and etc. In some embodiments, the spectrometer and gas sensor can be included as a part of a chemical sensor when they are used to determine different chemical composition of fruits, which can be gas or liquid or solids.

The system may include a remote server 111 located in the "cloud." The remote server 111 may store various information related to shopping or the remote shopping assistant 101. For example, the remote server 111 may include a database 113. The remote server 111 may also be in communication through wireless network transmissions to the remote shopping assistant 101, grocery store (e.g., via shelf camera 120, smart glove 130, or other hardware), or other servers. The database 113 may include information related to the shopper, grocery items (e.g., produce or any other grocery item), etc. For example, the remote server 111 may include data regarding the pricing of items, quantity of items, images of the items, manufacturing or growing information, and other data related to grocery items.

The system 100 may include a mobile device 115. The mobile device 115 may include a phone, tablet, wearable device, or other items. The mobile device 115 may include an application that is utilized to pick and choose grocery or produce. The phone 115 may include a display that has a freshness bar 117. The freshness bar 117 may indicate a freshness level for a particular produce item or grocery item, such as a fruit or vegetable. The mobile device 115 may include various other applications related to the remote shopping that allow the user to pick and choose groceries, make purchases, view images from various cameras in system 100, etc.

The system may also include a shelf camera 120. The shelf camera 120 may be located at a retail store. The shelf camera 120 may be pointed at various items, such as groceries, produce, pricing information, or other information to allow the system to capture information related to those various items. The Shelf camera may include a shelf camera CPU 125. The shelf camera CPU 125 may be utilized to process data and information from the shelf camera 123. The processing of the data and information can also be done through the cloud where the shelf camera may send the raw data or semi-processed data with only critical information to the cloud for more processing or analysis.

The system may also include a smart glove 130. The smart glove 130 may be utilized by the remote shopping assistant 101 or any other person or robot. The smart glove 130 may include its own glove CPU 131. The glove CPU 131 may be utilized to process data and information from the glove 130. The glove 130 may include one or more sensors 135 utilized to aid the shopper in selecting produce. The sensors 135 may include a measurement sensor configured to weight any items to determine a quantity of the item. The sensors 135 may also include a moisture sensor to detect any moisture on produce or other items. The sensors 135 may also include a freshness sensor utilized to identify the freshness of the various produce. The sensors 135 may also include the ability to detect water content sensor or sugar content sensor to identify the hydration or sweetness of the various produce. In addition, various rations, such as the fruit to sugar ratio may be measured. The sensors may utilize the weight, the amount (e.g., quantity of fruit) and the size of the fruit (from the camera), to estimate the weight of the fruit without the seeds, pit or skin, using such information and working with a database. The database may include information regarding the average weight percentage of a fruit (e.g., plum, pear, etc. of a certain size. The camera can provide the system with the amount, the size, and the sensor can provide the weight which will allow us to calculate the actual fruit weight. For counting the quantities of the produce or grocery item, the system may utilize gesture recognition using the smart gloves. For example, for larger produce (e.g., bananas), the glove can be set to be on the counting mode, and using finger to tap at each one, the glove records the total quantity. Or in another example where there is a bunch of produce, the circumference of the produce based on the grab of the fingers, can determine the quantity. This may apply to where cost is not based on weight but based on quantity. In yet another embodiment, the body sensors can be equipped with a microphone where the shopping assistant can just say the amount and the system will record the quantity.

The smart glove 130 may include its own communication module 139 as part of the system. For example, the glove communication module 139 may be configured to wirelessly transmit data to the remote shopping assistant 101, shelf camera 120, cloud 111, remote user, or remote mobile device 115. The glove communication module 139 may be a wireless transceiver utilizing various data communication protocols, such as LTE, 4G, 5G, etc. in another embodiments, the communication module 139 may be a short-range transceiver, such as a Bluetooth transceiver or Zigbee transceiver utilized to communicate data between the smart glove and other devices.

The smart glove 130 may include its own display 133. The display 133 may be utilized to output information to the shopping assistant. For example, the display 133 may be touch panel display, LCD, LED. OLED screen, or any other type of screen. The display 133 may output notifications to the shopping assistant, such as those notifications that indicate a modification to the grocery list (e.g., removing, adding, editing, or cancelling items off the grocery list). The notifications can include prompts, pop-ups, sound effects, text, and etc.

The smart glove 130 may include its own power transceiver 137. The power transceiver 137 may be configured to turn on the smart glove 130 to allow all components to operate. The power transceiver 137 may allow for an AC or DC adapter to power or charge the smart glove 130. Thus, the power transceiver 137 may supply its own power to smart glove 130 or be utilized to charge a battery in some embodiments. The power transceiver 137 may also include an input for charging the battery that allows a mini-USB, micro-USB, lightening connector, etc. Thus, the battery may be utilized to power the display 133 and various sensors, cameras, and other components of the smart glove 130.

Figure 2:
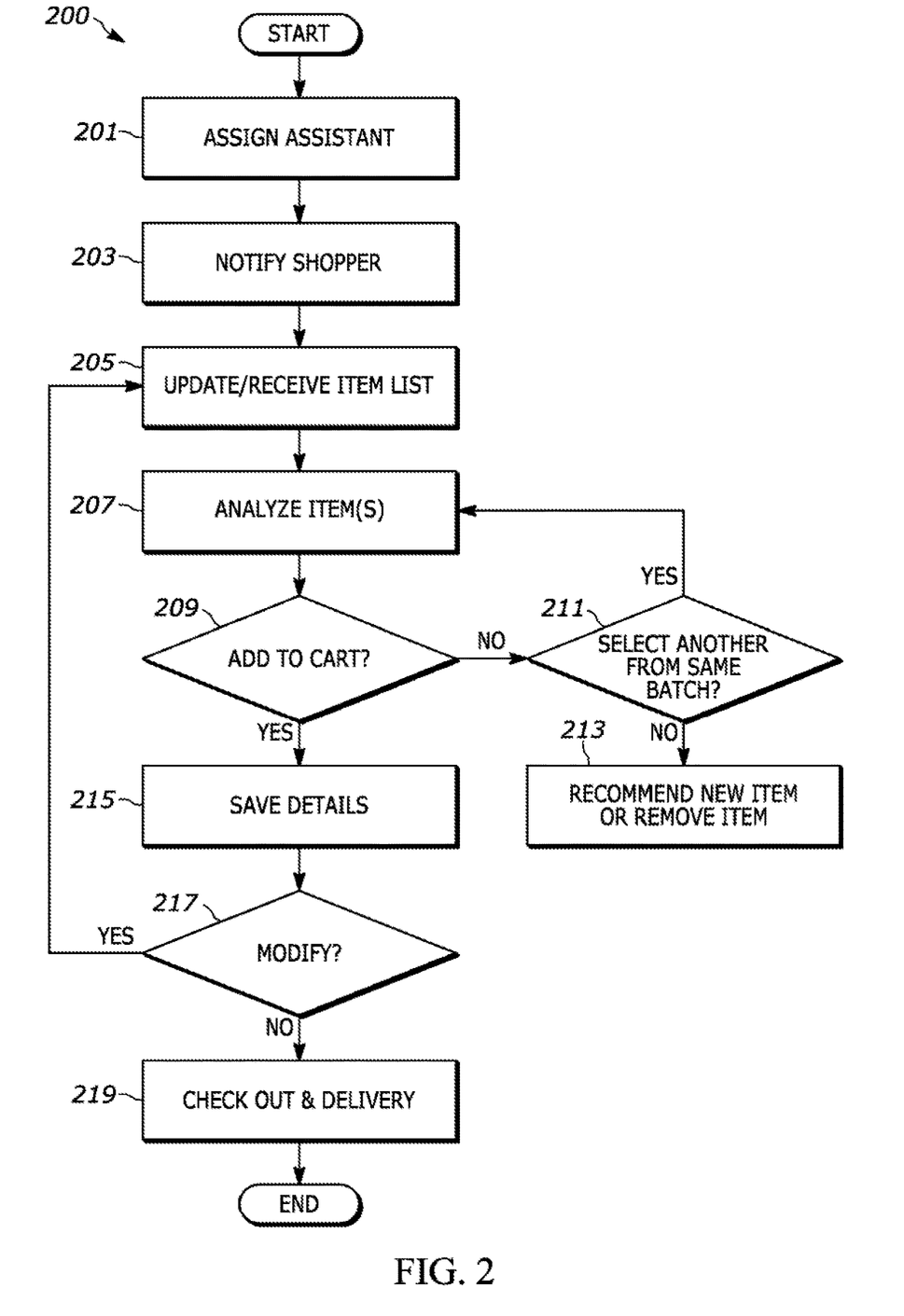
FIG. 2 is a flow chart of system operation of the personalized remote shopper.

FIG. 2 discloses an illustrative flow chart associated with the remote shopping assistant. At step 201, the system may assign an assistant to a shopper. The system may begin to assign the assistant to the shopper based on a trigger or request from an application, website, or other type of input. The system may assign the assistant based on a distance from the delivery location, rating, compatibility with the shopper, store that the assistant is shopping at (e.g., shopping at the same store as the shopper wishes to purchase items), etc. The assistant may be geared with a display, tablet, smart glasses, smart gloves, or other items to assist in the remote shopping for the shopper. It should be noted that the system may allow for a shopping assistant to be utilized or the embodiments disclosed in FIGS. 3-5 that allow a smart camera system to pick various items to replace the shopping assistant. Thus, the smart camera system may replace components associated with the shopping assistant in certain embodiments.

At step 203, the system may notify a shopper that a selection will occur. In parallel, the system may allow a shopper to view or interact in real time with the various grocery items or produce. The shopper may view images or videos taken from cameras in a retail store (e.g., grocery store) or on a bodysuit of a shopper or robot. A notification or message may be sent to a mobile device associated with the remote shopper. The notification or message may be originated from the cloud or remote database and sent to the remote shopper. Additionally, notifications may be sent to the shopping assistant in certain circumstances, such as notification of a modification of the shopping list or editing the shopping list.

At step 205, the system may receive a list of items. The list of items may also be updated continuously throughout the process. The list of items may be selected on a mobile application (or other type of application) on a mobile device (or a computer, etc.) of the shopper that is communicated to the cloud. The cloud may store the list in a database on the server. The cloud may be a central repository to share the data throughout the system, such as the retailer, shopping assistant, shopper, etc. The database and the associated list of items may include data related to the brand, quantity, pricing, product description, nutrition information, etc.

At step 207, the system may analyze the items. The system may receive data from the remote shopping assistant to analyze the items. For example, the remote shopping assistant may be equipped with smart gloves that are utilized to evaluate the freshness of the item. For example, the smart gloves may be equipped with a sensor to identify the freshness of the vegetable by analyzing the color, moisture level, or other indicators. The system may also begin to analyze the items on the list in response to the shopping assistant arriving to a section of a grocery store or identifying a type of grocery item (e.g., produce) that is recognized by image recognition software.

Add decision 209, the system may decide whether to add the item to the cart. The system may receive inputs from the shopper to determine if the item should be added to the cart. Thus data that has been communicated from the shopping assistant to the remote shopper (via the remote server or directly to the remote shopper) may indicate the analysis of the grocery item (e.g., produce). From there, the remote shopper may receive such data indicative of freshness, color, weight, softness, ripeness, etc. The data or information that the remote shopper may receive may be derived from the various sensors (e.g., chemical sensor, gas sensor, spectrometer, etc.). The remote shopper may then decide from the data whether or not to accept the item. The remote shopper may thus choose to select the item, find another item, or cancel shopping altogether. The selection from the remote shopper may be sent via data to the shopping assistant, either directly or via the remote server.

Add decision 211, the system may determine if a shopping assistant should select another item from the same batch. If the shopping assistant manually or automatically (e.g., via data retrieved from the sensors) identifies multiple grocery items, it may determine that another selection can be made from the same batch. If it identifies the other items, the shopping assistant may send a notification to a user indicating that the other similar grocery items are available. For example, the system may be selecting a banana from a certain area of the store. The system may notice that other bananas are also located in that area, if the system recognizes the other bananas based on image data and image recognition patterning, the system may send a notification to a user indicating other bananas may be selected.

At decision 213 the system may recommend a new item for the list. For example, if the shopper decides not to select a certain item, data indicating that the shopper will not purchase the item is communicated between the shopper and the system (e.g., shopper decides not to purchase a banana because it is not ripe yet, the system can suggest to substitute with apple). The system may try to identify comparable items from a similar brand or other similar object. For example, the system may include a database listing attributes of an associated item, including data related to type of food or item, brand, similar items, etc. Thus, for example, if a full-fat Chobani branded Greek yogurt vanilla flavor is unavailable, the system may thus look for similar foods (e.g., Greek yogurt), similar brand (e.g., Chobani), alternative variant (e.g., zero-fat or "light"), alternative brand (e.g., Yoplait or Danon), alternative flavor (e.g., strawberry, mixed berry, plain, etc.), or other item. In another example, if the system is connected to the shopper's recipe apps, the system can also suggest substitutes based on the recipe and common known substitutes. In another example, if the system is also connected to the shopper's smart fridge and the system knows that the shopper has other substitutes at home, the system can also suggest to use the ingredient at home first and not buy any other product.

In yet another embodiment, the system may also send periodic alerts allowing the shopper to be notified of different times that the shopping assistant may be in a specific aisle. A GPS receiver associated with the shopping assistant (e.g., GPS on wearable device like a smart glove, or a body camera, etc.) may be utilized to ping location information of the shopping assistant. The location data may be matched with map database information detailing the aisles and other data related to the retailer to be utilized to show a remote shopper information about the shopping assistance location relative to the store. For example, when the shopping assistant is shopping at a store, the system may notify the remote shopper by sending (via the transceiver) location information of which aisle the shopping assistant is located at utilizing the OPS data. In other scenarios, the system may notify the remote shopper by sending (via the transceiver) location information of which foods or items are nearby to the shopping assistant as located utilizing the GPS data. This information can also be displayed in a map format or real-time map with indications of what is nearby.

At step 215, the system may save details regarding the items to be added to the cart. The details may include data regarding input received at various sensors of the smart glove, camera, smart glasses, etc. Such details may include any data, such as image recognition, moisture levels, color levels, mold detection, etc. The system may save such details for future reference to be utilized by the system. For example, the system may save details regarding pricing to determine if a sale price or lower price has been met. The system may then notify a shopper or shopping assistant that the price is a new low price. The system may notify the shopper or shopping assistant by sending data indicative of such via the transceiver.

At decision 217, the system may determine if the list is modified. If the shopper or shopping assistant decide to modify the list or any items on the list through the application, the system may then return to step 205 and modify the list. Data may be communicated between the remote shopper and remote shopping assistant via the server to indicate modification of the grocery list. Such modifications may include adding items, modifying quantity of items, modifying a weight or measurement of items, or removing items.

At step 219, the system may check-out the items in the cart for purchase and begin delivery. Thus, the shopping assistant may receive a confirmation that the shopper confirmed all purchases. The shopper may confirm that purchase utilizing, a mobile device. The shopping assistant may then receive the confirmation and physical purchase the items at the grocery. Once the shopper purchases the items (either utilizing their own payment profile or the shopper's payment profile), the shopper may receive a confirmation email or notification (e.g. SMS message or another alert). The system may also send periodic alerts allowing the shopper to be notified of different times that the shopping assistant or associated delivery vehicle may be located en route to delivery the retail or grocery items. For example, the system may utilize GPS location data to send location data to the server. The system may also send a photo of the delivered goods at the shipping location to verify delivery and time of delivery. In the alternative, with smart home devices, the delivery person may even be able to either drop off the goods inside the home or even unload the goods into the kitchen for the shopper if shopper allows that.

Figure 3:
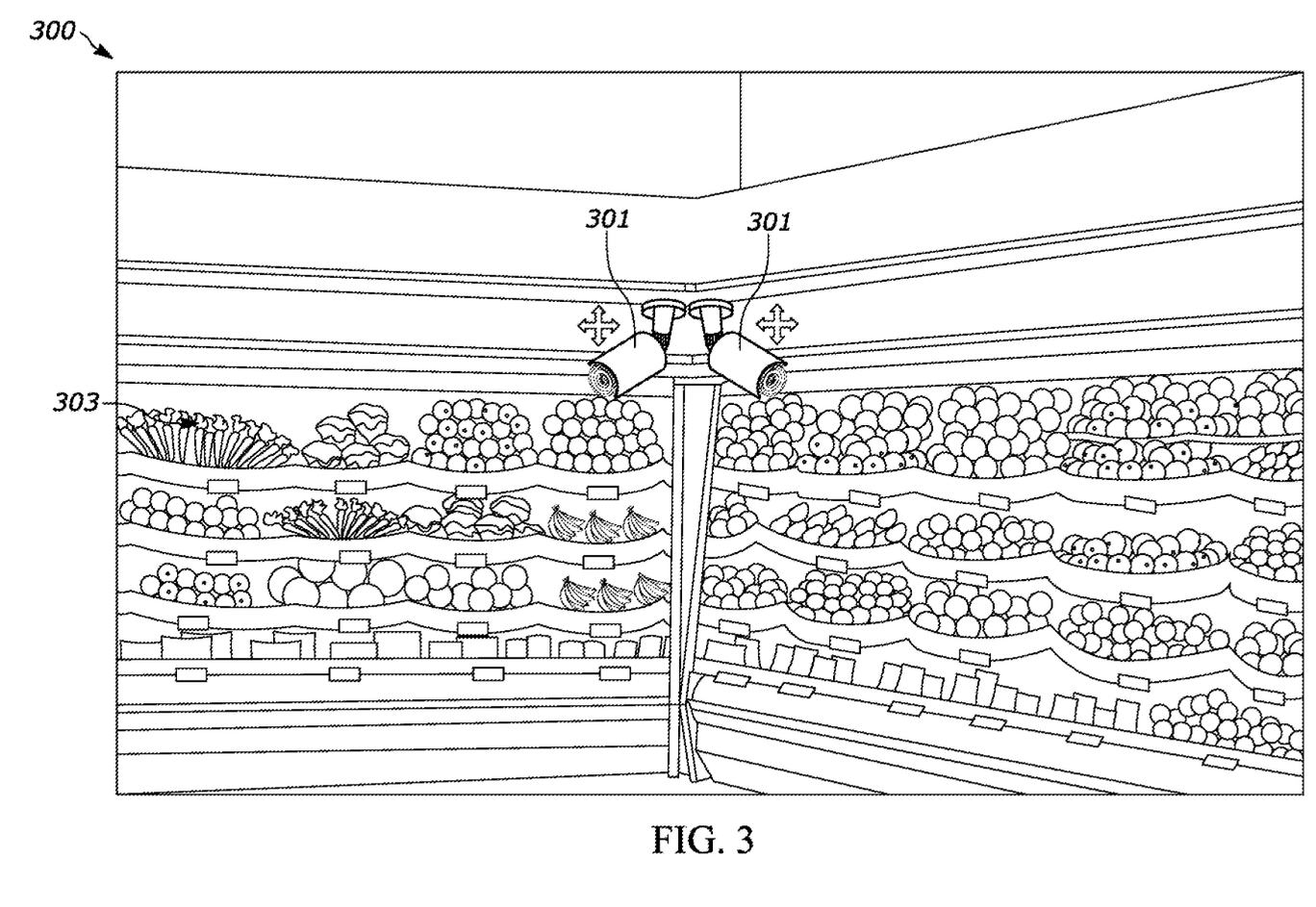
FIG. 3 discloses an example of a smart camera system located near produce in a grocery store in one embodiment.

FIG. 3 discloses an example smart camera system 300 located near produce 303 in a grocery store in one embodiment. As shown, one or more cameras 301 may be pointed at the produce. The cameras may be thermal cameras or high-resolution cameras to help display detailed features of the produce. Furthermore, the cameras may either include wireless transceivers to communicate to remote servers, mobile devices (e.g., shopping assistant or shopper), etc. The cameras may have the ability to move around in a 360-degree rotation to allow a full view of the produce. Furthermore, the cameras may have a zoom capability to zoom into the various produce. The cameras may be control led remotely from a mobile device associated with the shopper or the shopping assistant. Thus, an application or website may allow for the cameras to be remotely controlled via an interface. The camera system may work similar to the remote shopping assistant's component as explained in FIG. 2. Thus, the camera system may communicate data remotely to the remote shopper utilizing a transceiver and modify selections and purchases based on feedback from the remote shopper.

Figure 4:
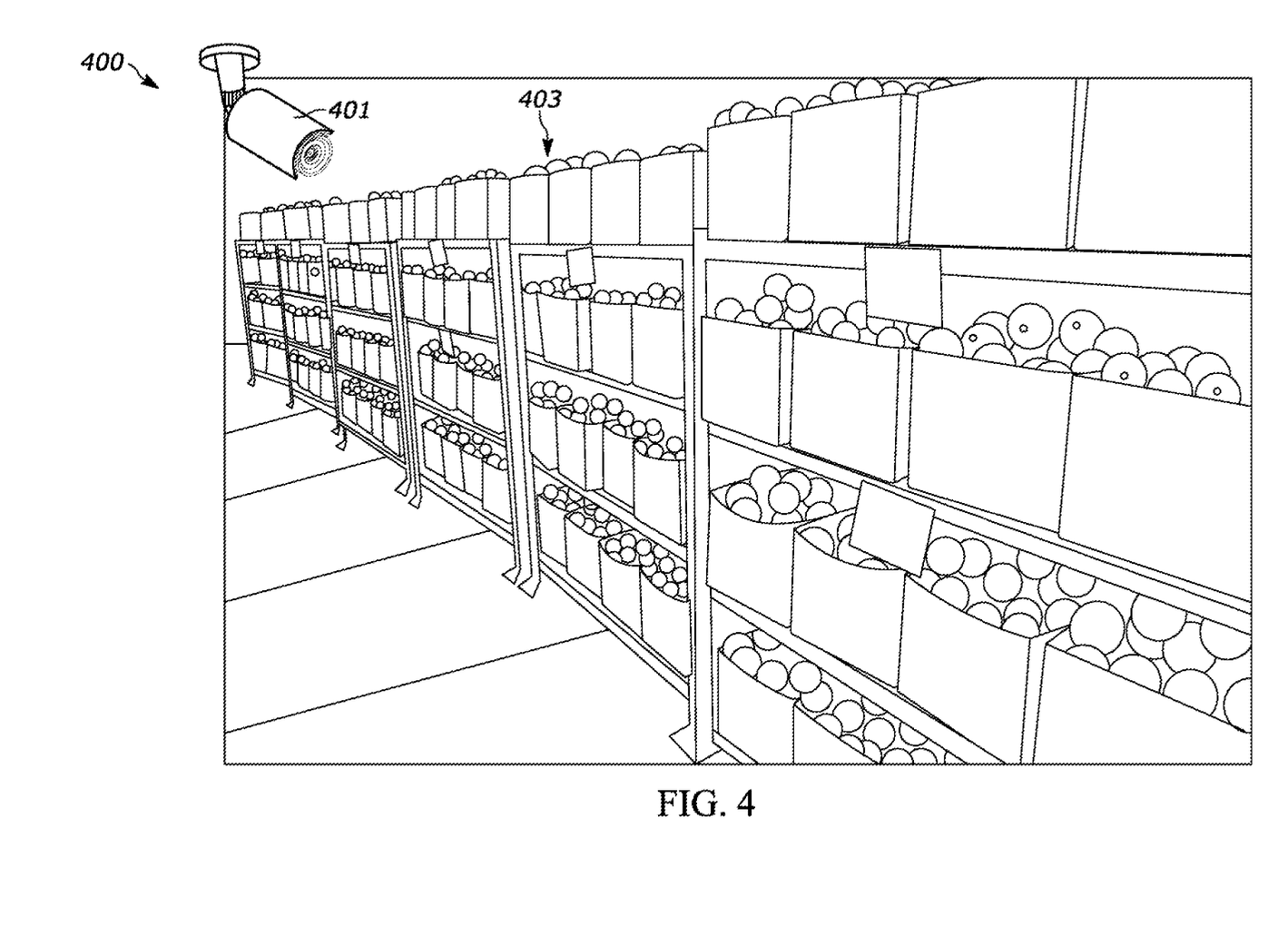
FIG. 4 discloses an example of a smart camera system located near produce in a grocery store or produce facility in one embodiment.

FIG. 4 discloses an example a smart camera system 400 located near produce 403 in a grocery store in one embodiment. In this embodiment, the camera 401 may be utilized at a food storage facility rather than a grocery store or traditional retailer. Thus, the camera 401 may be analyzing items at a wholesaler that have yet made it to consumers. The camera 401 may have zoom capabilities that allow it to zoom into grocery items (e.g., produce) or retail items to analyze the quality. The camera 401 may zoom in and take high-resolution video or photos that are sent to a server for analysis via image recognition. Thus, depending on the color or other details regarding the item, the server may be able to determine if the items are at an ideal freshness level. In another embodiment, a shopping assistant may be utilized similar to the embodiments disclosed above, however, utilized in a wholesaler setting rather than a retail setting. Thus, the shopping assistant may utilize its various sensors for a wholesale setting versus a retail setting.

Figure 5:
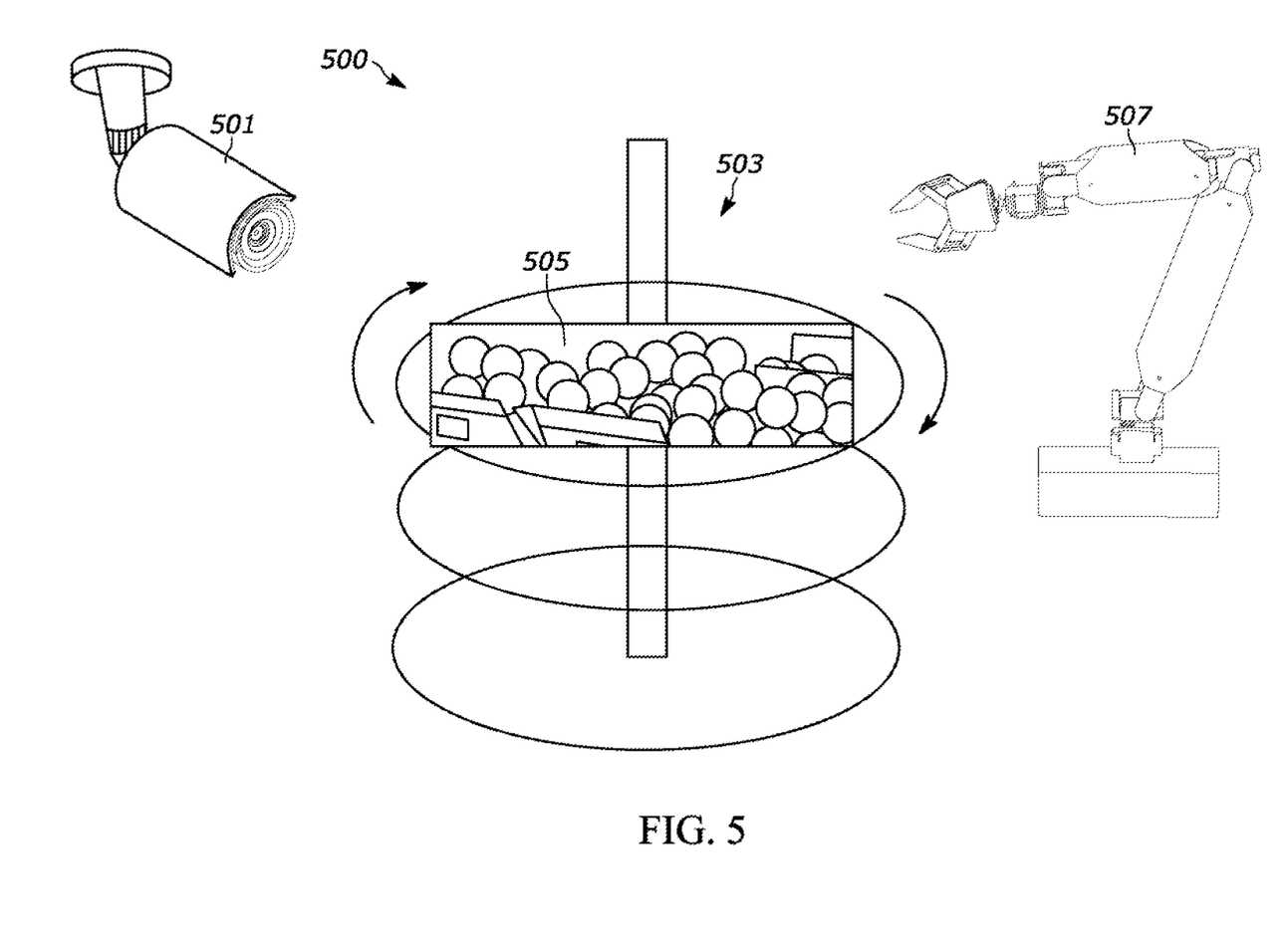
FIG. 5 discloses an example of an embodiment of an example smart camera system 500 setup on a produce conveyor system.

FIG. 5 discloses an embodiment of an example smart camera system 500 setup on a produce conveyor system that includes a robotic arm 507 according to one embodiment. For example, the smart camera system may include a smart camera 501 that may be utilized to capture high-resolution images of various produce 505, grocery items, or other retail items. The smart camera system may allow for the ability to zoom in and out and other options to view details of the items (e.g., produce 505, grocery, retail items). Such data may be communicated to the remote shopper via the transceiver through the remote server or directly between the components (e.g., wearable device, smart glove, smart camera, etc.). If the system 500 receives feedback to select a certain item, the system may communicate with the robotic arm 507 to grab the appropriate item. The robotic arm may then receive signals indicating exactly which item to grab as determined by the system. The item may be selected and bagged or given for eventual shipment to a remote shopper. In order to allow full access to all items, a conveyor 503 may be utilized to help the robotic arm to select all items.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for remote shopping, comprising:
a wearable device configured to be worn on a remote shopping assistant, wherein the wearable device includes:
one or more sensors in the wearable device configured to detect at least a weight of one or more grocery items, wherein the one or more sensors includes an optical spectrometer configured to identify a color of the one or more grocery items, wherein the color is utilized to correlate ripeness or water content associated with the one or more grocery items; and
a wearable device transceiver configured to communicate at least data indicative of the weight of the one or more grocery items to and from a remote server, wherein the remote server is configured to communicate data to a remote shopper;
a camera configured to capture image data related to the one or more grocery items; and
a processor in communication with the wearable device transceiver, the camera, and the one or more sensors, wherein the processor is configured to determine a freshness level associated with the one or more grocery items utilizing at least the one or more sensors in the wearable device and the image data related to the one or more grocery items.

2. The system of claim 1, wherein the system further includes a body camera worn on the remote shopping assistant, wherein the body camera is configured to capture images or video of an area proximate the remote shopping assistant.

3. The system of claim 2, wherein the body camera includes a body camera transceiver configured to communicate data indicative of the area proximate the remote shopping assistant to the remote shopper via the remote server.

4. The system of claim 1, wherein the wearable device transceiver is further configured to communicate data indicative of a grocery list retrieved from the remote shopper.

5. The system of claim 1 wherein the wearable device further includes a gas sensor configured to identify a gas produced from the one or more grocery items.

6. The system of claim 5, wherein the processor is further programmed to determine the freshness level associated with the one or more grocery items utilizing at least the gas sensor.

7. The system of claim 1, wherein the processor is further programmed to identify one or more persons in the image data and blur a face associated with the one or more persons.

8. The system of claim 1, wherein the wearable device includes a GPS transceiver configured to identify a location of the remote shopping assistant.

9. A wearable device configured to be worn on a remote shopping assistant, comprising:
  one or more sensors in the wearable device configured to detect a weight and color of one or more grocery items, wherein the one or more sensors includes an optical spectrometer configured to identify a color of the one or more grocery items;
  a transceiver configured to communicate data indicative of the one or more grocery items to and from a remote server and a remote shopper via the remote server;
  a camera configured to capture image data related to the one or more grocery items;
  a display configured to output information; and
  a processor in communication with the transceiver, the camera, the display, and the one or more sensors, wherein the processor is configured to determine a freshness level associated with the one or more grocery items utilizing at least the one or more sensors in the wearable device and the image data, wherein the processor is further configured to, utilizing image recognition, identify a bar code associated with the one or more grocery items or identify a type of produce.

10. The wearable device of claim 9, wherein the one or more sensors includes a moisture sensor configured to detect moisture on the one or more grocery items.

11. The wearable device of claim 9, wherein the wearable device includes a GPS transceiver configured to identify a location of the remote shopping assistant.

12. The wearable device of claim 9, wherein the one or more sensors includes a spectrometer, a gas sensor, or a softness-measurement sensor.

* * * * *